US005481901A

United States Patent [19]

Huang

[11] Patent Number: 5,481,901
[45] Date of Patent: Jan. 9, 1996

[54] DEVICE FOR DEMONSTRATING AND TESTING ELECTRONIC METERS FOR BICYCLES

[75] Inventor: Chun-Mu Huang, Taipei Hsien, Taiwan

[73] Assignee: Echowell Electronic Co., Ltd., Taipei Hsien, Taiwan

[21] Appl. No.: 412,586

[22] Filed: Mar. 29, 1995

[51] Int. Cl.$^6$ .................................................. G01P 21/02
[52] U.S. Cl. ................................. 73/2; 73/493; 434/373
[58] Field of Search ........................... 73/2, 493, 514.39; 324/202, 179; 273/269, 459, 460, 85 G; 434/61, 301, 302, 305, 373

[56] References Cited

U.S. PATENT DOCUMENTS

| | | | |
|---|---|---|---|
| 3,435,657 | 4/1969 | Weissman | 73/2 |
| 4,071,892 | 1/1978 | Genzling | 73/493 X |
| 4,246,790 | 1/1981 | Nichols | 73/493 |
| 5,008,647 | 4/1991 | Brunt et al. | 324/179 X |
| 5,027,640 | 7/1991 | Hinckley et al. | 324/202 X |
| 5,240,417 | 8/1993 | Smithson et al. | 73/379.07 X |
| 5,364,271 | 11/1994 | Aknin et al. | 434/61 |

*Primary Examiner*—Thomas P. Noland
*Attorney, Agent, or Firm*—Morton J. Rosenberg; David I. Klein

[57] ABSTRACT

A device for demonstrating and testing electronic meters for bicycles including a body portion having a slot, a rod mounted on the body portion, a plurality of seats mounted on the rod, a first magnet fitted on the body portion, a handwheel partially pivotally fitted in the slot of the body portion, a second magnet fitted on a the handwheel, and an electronic testing device disposed within the body portion and operatively connected with the seats, whereby the device can be used for demonstrating as well as testing electronic meters for bicycles.

6 Claims, 4 Drawing Sheets

DEVICE FOR DEMONSTRATING AND TESTING ELECTRONIC METERS FOR BICYCLES

BACKGROUND OF THE INVENTION

1. Field of the Invention

This invention relates to a device for demonstrating and testing electronic meters for bicycles.

2. Description of the Prior Art

It has been found that the electronic meter for bicycles will show speed, distance travelled by the bicycles, or the like on a screen when a sensor mounted on the forks or the seal: stays senses a signal from a magnet installed on the wheel. However, there are only simple display racks for demonstrating electronic meters for bicycles on the market and they all cannot be used for testing electronic meters.

Therefore, it is an object of the present invention to provide a device which can be used for demonstrating and testing electronic meters for bicycles.

SUMMARY OF THE INVENTION

This invention relates to a device for demonstrating and testing electronic meters for bicycles.

It is the primary object of the present invention to provide a device which can be used for demonstrating as well as testing electronic meters for bicycles.

It is another object of the present invention to provide a device which can be used for testing the bracket and sensor of an electronic meter for bicycles.

It is still another object of the present invention to provide a device for demonstrating and testing electronic meters for bicycles which will play bingo at the same time as the meters are tested.

It is still another object of the present invention to provide a device for demonstrating and testing electronic meters for bicycles which is interest in operation.

It is a further another object of the present invention to provide a device for demonstrating and testing electronic meters for bicycles which is very useful in promoting electronic meters for bicycles.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
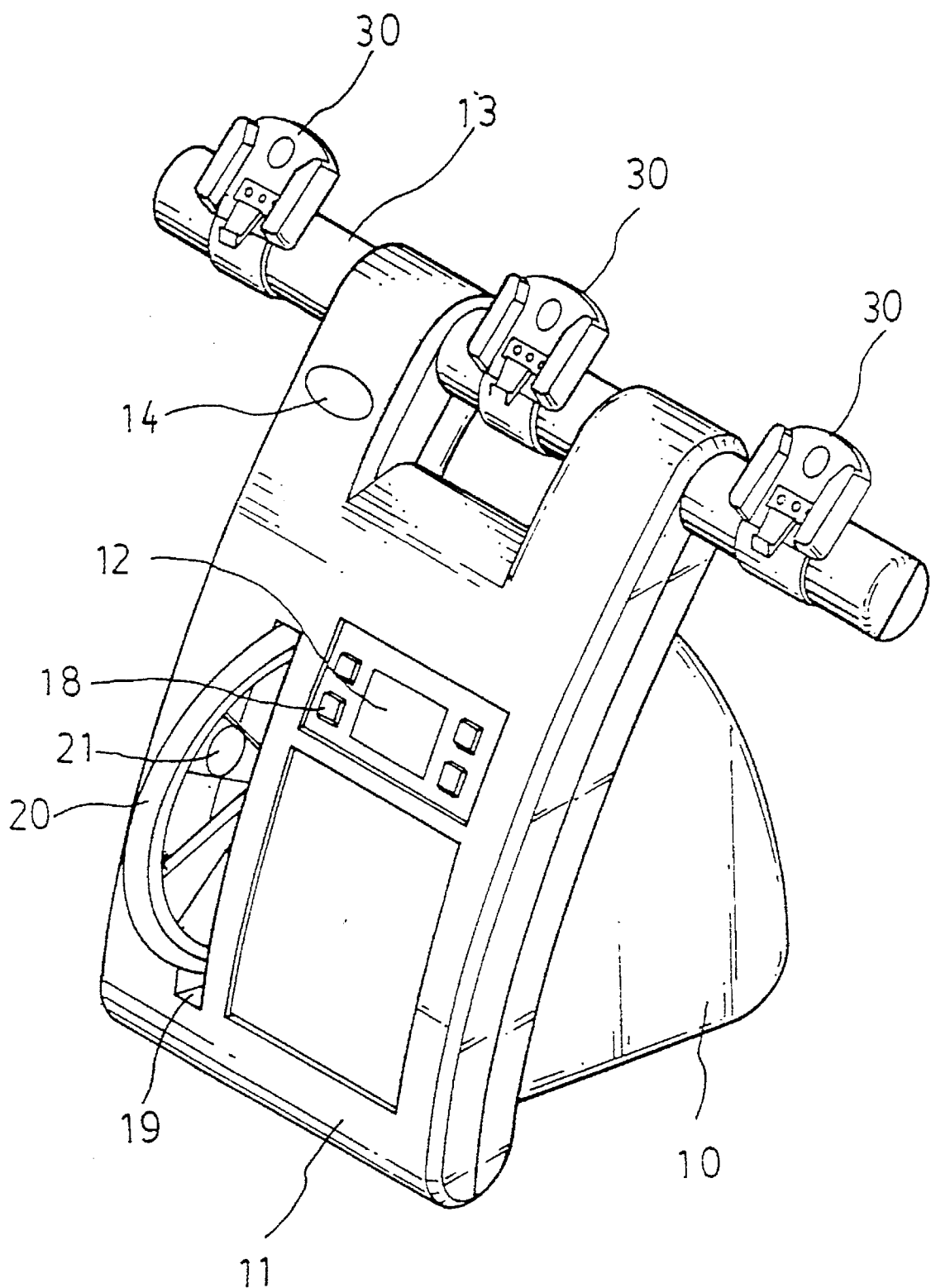
FIG. 1 is a front perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the device for demonstrating and testing electronic meters for bicycles comprises a body portion 10. The body portion 10 is provided with a front panel 11 on which are mounted a screen 12 and a plurality of keybuttons 18 above the screen 12. A handwheel 20 is partially fitted within the body portion 10 and located beside the screen 12. On the upper part of the body portion 10 is arranged a handlebar 13 which is provided with a plurality of seats 30 (three seats are shown in this preferred embodiment) for mounting electronic meters for bicycles. The seats 30 have the same function as those fitted on the handlebar (not shown) of a bicycle for mounting electronic meters. Further, the seats 30 are designed for demonstrating electronic meters for bicycles or for mounting electronic meters to be tested.

Figure 3:
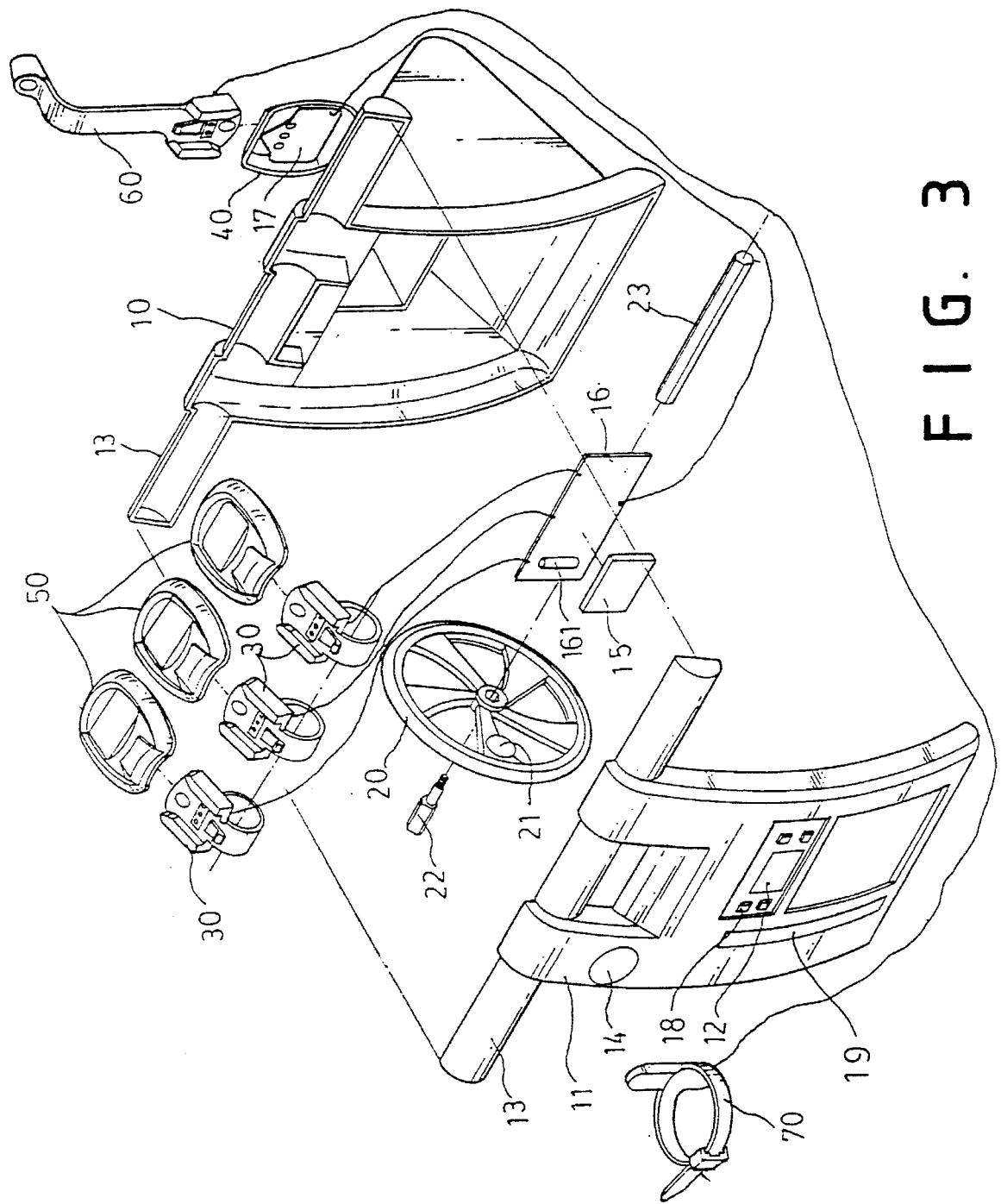
FIG. 3 is an exploded view of the present invention.

Referring to FIG. 3, the electronic bicycle meter 50, the bracket 60 and the sensor 70 are originally mounted on a bicycle. The sensor 70 is installed on the fork (not shown) of a bicycle which is provided with a magnetism sensing device (not shown). The bracket 60 is mounted on the handlebar (not shown) of a bicycle and has an input terminal (not shown) for receiving signals from the sensor 70 and an output terminal (not shown) for transmitting the signals to the electronic meters 50.

Figure 2:
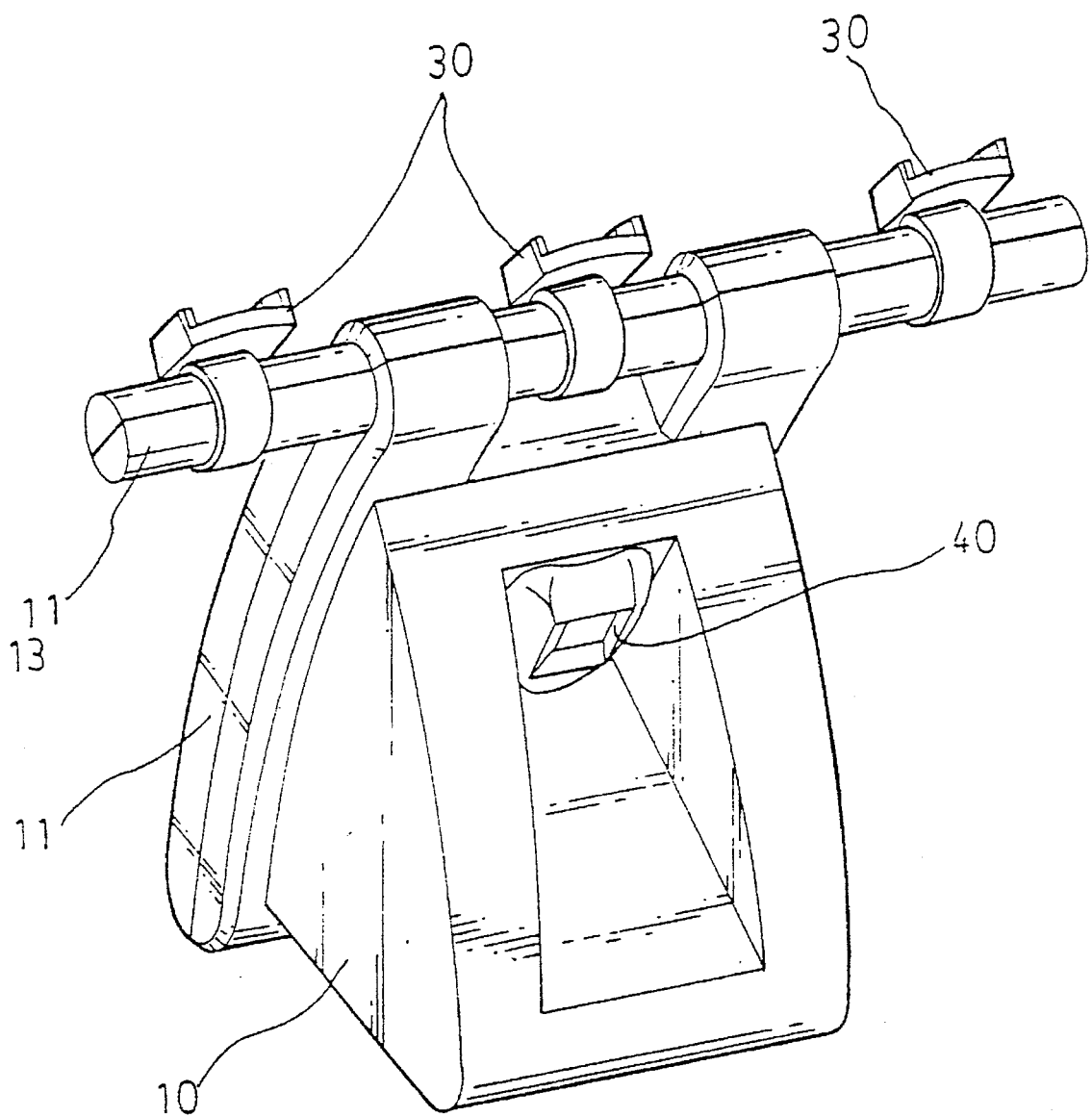
FIG. 2 is a rear perspective view of the present invention.

As shown in FIG. 3, a liquid crystal display 15 is arranged behind the screen 12 and connected with a first electrical circuit 16. The first electrical circuit 16 is the main component part of an electronic testing device and connected with a seat 40 (see FIG. 2) which is mounted at a rear side of the body portion 10. Numeric data can be manually input into the first electrical circuit 16 so as to test the accuracy of the electronic meters 50. A second electrical circuit 17 is mounted within the seat 40 and connected with the first electrical circuit 16. A first magnet 14 is fitted on the front panel 11. Within a slot 19 of the body portion 10 there are bearings (not shown) for supporting axles 22 and 23. The handwheel 20 is partially fitted into the slot 19 of the body portion 10 and supported by the axle 23. On the spoke of the handwheel 20 is mounted a second magnet 21 which is connected with a reed switch 161 of the first electrical circuit 16. Accordingly, the present invention can be used for demonstrating electronic bicycle meters as well as testing the functions of the electronic bicycle meter, bracket and sensor.

The calculation of the electronic testing device is based on the formula $S=L/T$, wherein $S$ represents the speed, $L$ the circumferential length of bicycle wheel, and $T$ the cycling time. When desired to perform a test for an electronic meter, first key in instructions through keybuttons 18 and then the preset time period which will be shown on the screen 12. Thereafter, key in the circumferential length of the wheel. Then, the electronic testing device will automatically calculate the value $S$ which will be shown on the screen 12. In the meantime, the electronic meters will, through the electronic testing device, calculate the value $S$ and show it on its dial (not shown). In comparison with the value $S$ shown on the screen 12, the user can see whether the electronic bicycle meters are accurate or not. If the electronic bicycle meters do not show any value, then they are surely not working and have to be replaced with new ones. When desired to test the bracket 60 and the sensor 70, it is only necessary to install the bracket 60 on the seat 40 at the rear side of the body portion 10 and then make the sensing portion of the sensor 70 contact the magnet 14. Then, the electronic testing device in the body portion 10 will show the function of the two components on the screen 12. In case of no signal shown on the screen, the two components must have already lost their function.

Further, the first electrical circuit 16 is designed with the ability to play a bingo game so that when the handwheel 20 is turned, the reed switch 161 will sense the number of cycle that the handwheel 20 has rotated and when the handwheel 20 is stopped, the bingo result which are randomly determined in accordance with the number of wheel revolutions will be shown on the screen 12 when the handwheel 20 is stopped. In addition, the bingo game can be set to show characters in addition to numerals.

Figure 4:
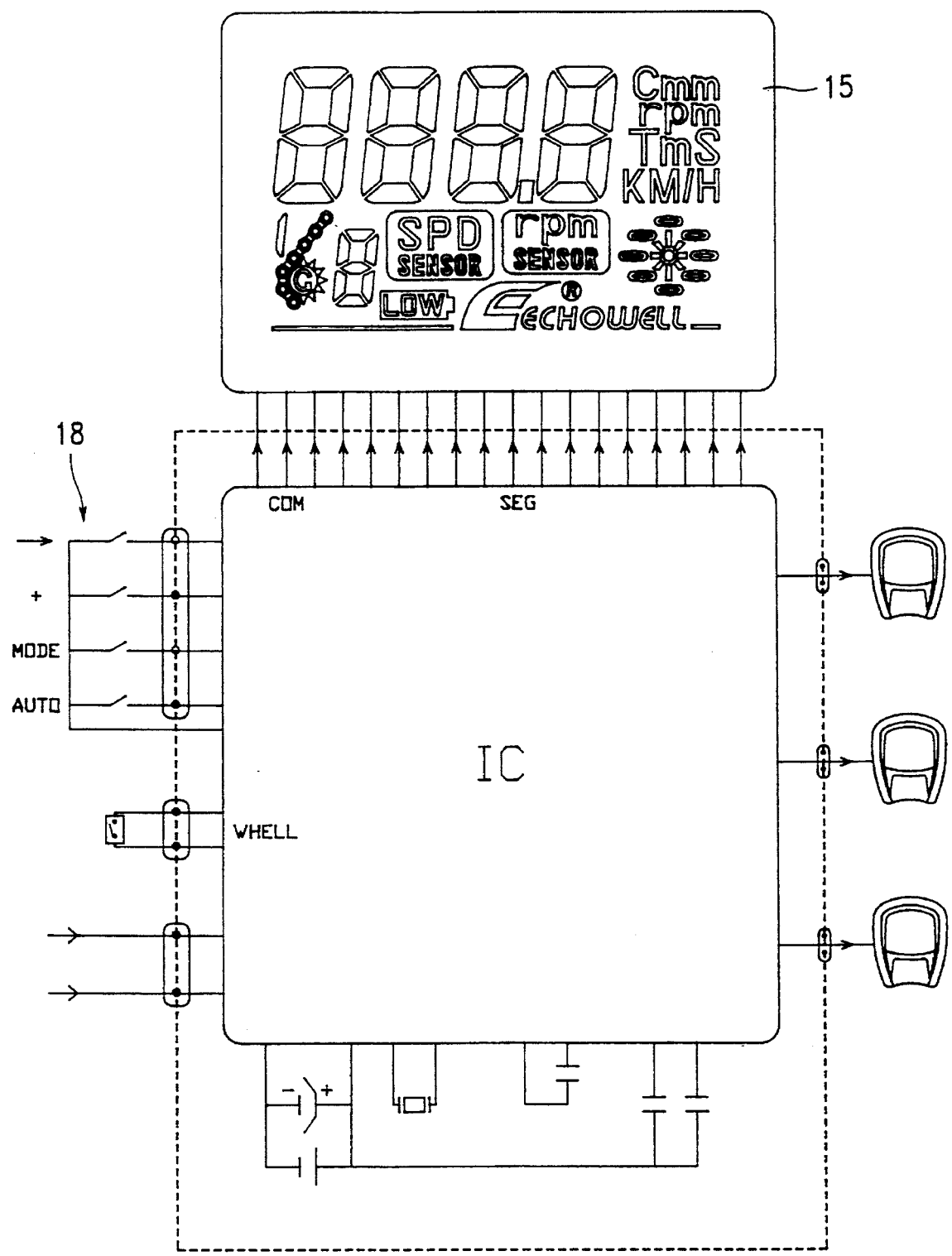
FIG. 4 shows the electrical circuit of the present invention.

FIG. 4 shows the electrical circuit of the present invention. The electrical circuit may be of any conventional design well known to those skilled in the art and is not considered a part of the invention.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A device for demonstrating and testing electronic meters for bicycles comprising:

a body portion having a slot;

a rod mounted on said body portion;

a plurality of seats mounted on said rod;

a first magnet fitted on said body portion;

a handwheel partially pivotally fitted in the slot of said body portion;

a second magnet fitted on a said handwheel; and an electronic testing device disposed within said body portion and operatively connected with said seats.

2. The device for demonstrating and testing electronic meters for bicycles as claimed in claim 1, wherein said rod is in shape of a handlebar.

3. The device for demonstrating and testing electronic meters for bicycles as claimed in claim 1, wherein said electronic testing device will show digital value to compare with value shown on electronic meters to be tested.

4. The device for demonstrating and testing electronic meters for bicycles as claimed in claim 1, wherein said electronic testing device applies a formula $S=L/T$, wherein S represents speed, L circumferential length of bicycle wheel, and T cycling time, and will automatically calculate value S by keying in L and T thereby enabling a user to compare the value S with a value S shown on said electronic meters.

5. The device for demonstrating and testing electronic meters for bicycles as claimed in claim 1, wherein said electronic testing device is provided with a bingo game therein which will show preset contents corresponding to revolution numbers of said handwheel when said handwheel is stopped.

6. The device for demonstrating and testing electronic meters for bicycles as claimed in claim 5, wherein said bingo game can be set to show numerals or characters.

* * * * *